United States Patent
Grimminger et al.

(10) Patent No.: US 7,593,716 B2
(45) Date of Patent: Sep. 22, 2009

(54) METHOD FOR TRANSMITTING DATA IN A WLAN NETWORK

(75) Inventors: Jochen Grimminger, München (DE); Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 10/546,099

(22) PCT Filed: Dec. 19, 2003

(86) PCT No.: PCT/DE03/04220

§ 371 (c)(1), (2), (4) Date: Aug. 18, 2005

(87) PCT Pub. No.: WO2004/077783

PCT Pub. Date: Sep. 10, 2004

(65) Prior Publication Data

US 2006/0233140 A1    Oct. 19, 2006

(30) Foreign Application Priority Data

Feb. 28, 2003   (DE) .............................. 103 08 935

(51) Int. Cl.
*H04W 4/00* (2006.01)
(52) U.S. Cl. ....................... 455/411; 455/410
(58) Field of Classification Search ............... 455/410, 455/411
See application file for complete search history.

(56) References Cited

U.S. PATENT DOCUMENTS

| | | | | |
|---|---|---|---|---|
| 6,061,650 | A * | 5/2000 | Malkin et al. | 704/228 |
| 6,608,832 | B2 * | 8/2003 | Forslow | 370/353 |
| 6,788,676 | B2 * | 9/2004 | Partanen et al. | 370/352 |
| 7,103,313 | B2 * | 9/2006 | Heinonen et al. | 455/41.2 |
| 2001/0032262 | A1 | 10/2001 | Sundqvist et al. | |
| 2003/0026232 | A1 | 2/2003 | Uskela | |
| 2004/0073785 | A1 * | 4/2004 | Hurtta et al. | 713/155 |
| 2004/0148425 | A1 * | 7/2004 | Haumont et al. | 709/236 |
| 2004/0203732 | A1 * | 10/2004 | Brusilovsky et al. | 455/426.1 |
| 2005/0096012 | A1 * | 5/2005 | Borella et al. | 455/411 |

OTHER PUBLICATIONS

P. Calhoun, J. Loughney, E. Guttman, G. Zorn, J. Arrkko, "Diameter Base Protocol", Network Working Group, Sep. 2003, http://www.ietf.org/internet-drafts/draft-ietf-aaa-diameter-17.txt, pp. 1-147.

(Continued)

*Primary Examiner*—Nick Corsaro
*Assistant Examiner*—Vladimir Magloire

(57) ABSTRACT

The invention relates to a method for transmitting data in a WLAN network (WLAN=Wireless Local Area Network) during which WLAN messages are transmitted in the L2 protocol layer between a terminal and an access node of the WLAN network, whereby the access node can be connected to one or more data networks. According to the invention, the WLAN messages contain SIP messages with SIP authentication data (SIP=Session Initiation Protocol). The SIP authentication data is extracted from WLAN messages arriving in the access node and are integrated in the form of authentication data in messages of the RADIUS protocol and/or of the diameter protocol (RADIUS=Remote Authentication Dial In User Service).

13 Claims, 3 Drawing Sheets

OTHER PUBLICATIONS

J. Rosenberg, H. Schulzrinne, G. Camarillo, A. Johnston, J. Peterson, R. Sparks, M. Handley, E. Schooler, "SIP: Session Initiation Protocol", Network Working Group, Jun. 2002, http://www.ietf.org/rfc/rfc3261.txt, pp. 1-269.

Aki Niemi, "Authentication, Authorization and Accounting in Session Initiation Protocol Networks", Thesis Helsinki University of Technology, Mar. 7, 2002, pp. 1-76.

B. Sterman, D. Sadolevsky, D. Schwartz, D. Williams, "RADIUS Extension for Digest Authentication", Internet Engineering Task Force, Internet Draft, Nov. 12, 2001, pp. 1-9.

Srinivas, Chan, Sendodan, Costa-Requena, "Mapping of Basic and Digest Authentication to Diameter AAA Messages", Internet Draft, draft-srinivas-aaa-basic-digest-00.txt, Jul. 13, 2001, pp. 1-23.

Bryan J. Byerly, David Williams, "SIP Authentication using CHAP-Password", Internet Engineering Task Force, Internet Draft, draft-byerly-sip-radius-00.txt, Oct. 2000, pp. 1-13.

C. Rigney, S. Willens, A. Rubens, W. Simpson, "Remote Authentication Dial In User Service (RADIUS)", Network Working Group, http://www.ietf.org/rfc/rfc2865.txt, Jun. 2000, pp. 1-76.

M. Handley, V. Jacobson, "SDP; Session Description Protocol", Network Working Group, RFC 2327, Apr. 1998, pp. 1-42.

L. Blunk, J. Vollbrecht, "PPP Extensible Authentication Protocol (EAP)", Network Working Group, RFC 2284, http://www.ietf.org/rfc/rfc2284.txt, Mar. 1998, pp. 1-15.

\* cited by examiner

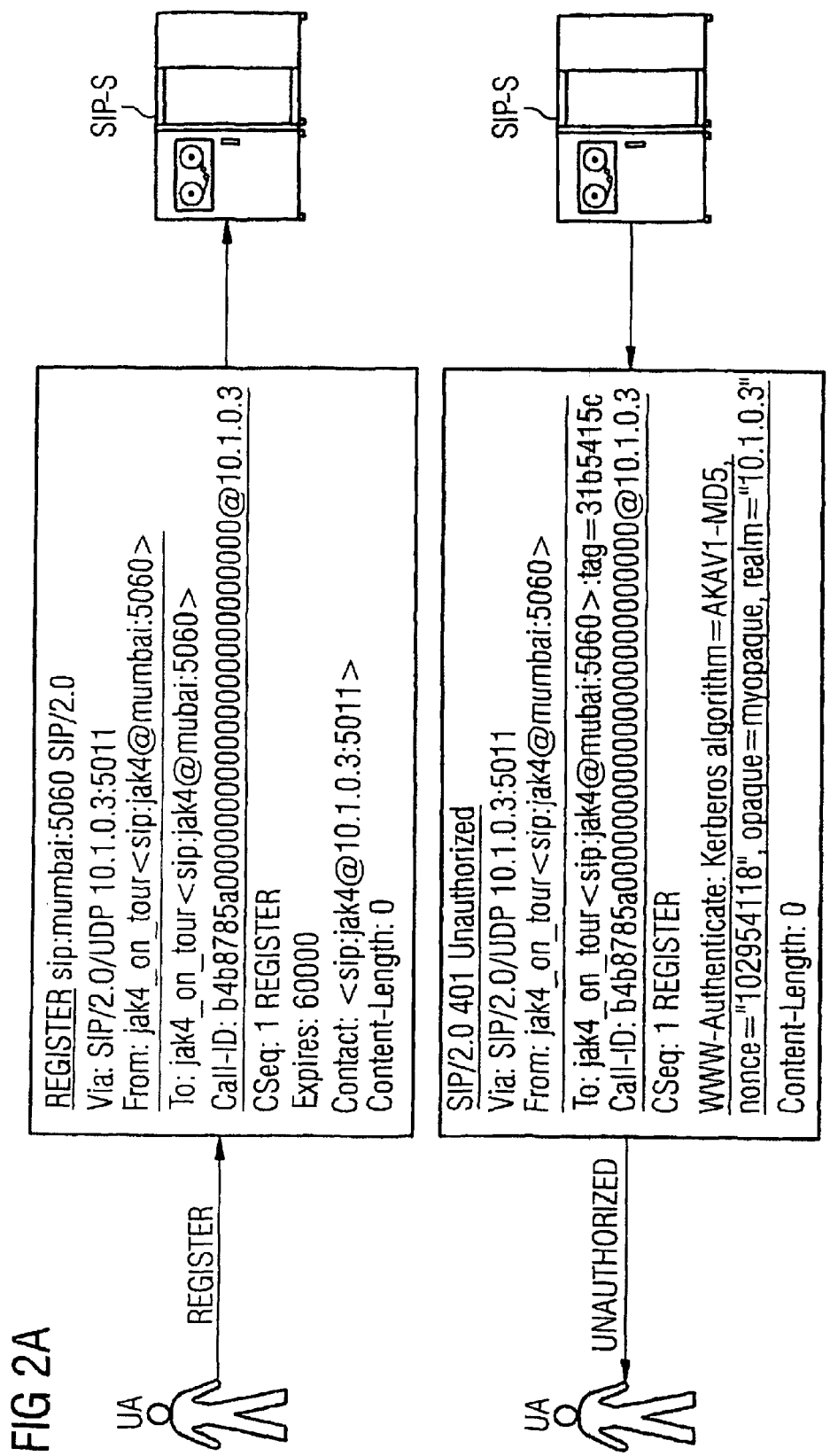

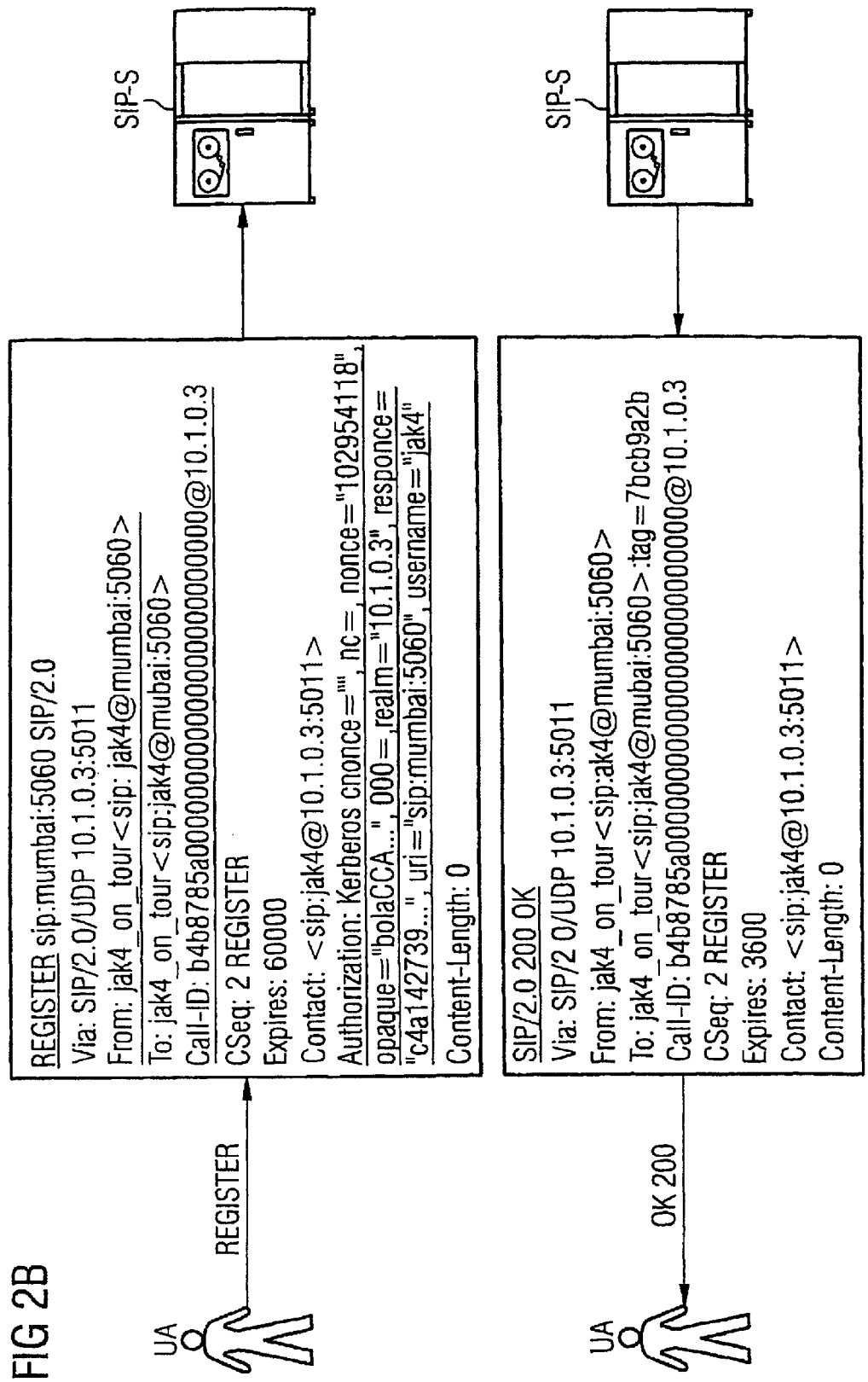

METHOD FOR TRANSMITTING DATA IN A WLAN NETWORK

CROSS REFERENCE TO RELATED APPLICATIONS

This application is the U.S. National Stage of International Application No. PCT/DE2003/004220, filed Dec. 19, 2003 and claims the benefit thereof. The International Application claims the benefits of German application No. 10308935.7, filed Feb. 28, 2003, both applications are incorporated by reference herein in their entirety.

FIELD OF INVENTION

The invention relates to a method for transmitting data in a WLAN network, a corresponding device for transmitting such data, and a corresponding data network.

SUMMARY OF THE INVENTION

The transmission of data via wireless local area networks (WLANs) has become more and more widespread over the last several years. WLAN stands for "Wireless Local Area Network" and denotes a local wireless network with ranges of several hundred meters. Nowadays, users of terminal devices, in particular of mobile radio devices and laptops, have the opportunity to register at any locations in commercially operated WLAN networks. With this arrangement the user can locate a plurality of WLAN networks via his or her terminal device, each WLAN network comprising what are known as access nodes (usually referred to as "access points") via which the user can obtain access to further data networks, in particular to the internet or to UMTS networks.

For the transmission of messages in a WLAN network it can prove advantageous that authentication data integrated in SIP messages (SIP=Session Initiation Protocol) is transmitted in the L2 protocol layer (L2=Layer 2). The SIP protocol is sufficiently well known from the prior art (see [1]) and is used for initializing a protocol session, more particularly in IP-based networks. In this context the term SIP includes both the currently used SIP protocols and SIP protocols that are presently in the process of development, such as, for example, SIPng (=SIP next generation). The use of the SIP protocol enables the authentication of a terminal device to be performed at an access node and in data networks that are connected to the access node so that an encrypted transmission of messages is made possible. However, a disadvantage is that the further data networks to which the WLAN access node can connect typically use RADIUS and/or Diameter servers for authentication, whereas said servers do not understand the SIP protocol. In such cases a further authentication above and beyond the access node in other data networks is not possible. The RADIUS and Diameter protocols are sufficiently well known from the prior art (see [2] and [3]). The RADIUS protocol in particular is included among the official AAA protocols (AAA=Authentication, Authorization, Accounting) of the Internet Engineering Task Force (IETF).

The object of the invention is therefore to provide a method for transmitting data in a WLAN network wherein the authentication is possible by means of SIP authentication data within the RADIUS and/or Diameter protocol.

This object is achieved by the claims.

In the method according to the invention, WLAN messages are transmitted between a terminal device and an access node of the WLAN network in the L2 protocol layer, whereby the access node can be connected to one or more data networks. The WLAN messages transmitted using the method contain SIP messages with SIP authentication data, the SIP authentication data being extracted from WLAN messages arriving in the access node and integrated as authentication data in messages of the RADIUS and/or Diameter protocol.

The invention is based here on the knowledge that the same authentication mechanisms are used both in the RADIUS/Diameter protocols and in the SIP protocol, which means that it is possible to extract authentication data from the SIP protocol and integrate said data into the RADIUS and/or Diameter protocol.

The particular advantage of the invention resides in the fact that RADIUS and/or Diameter protocols are still very commonly used for authentication in today's data networks and consequently the method can be used to ensure authentication both in a WLAN network and also in data networks which are connected to the WLAN network and use the RADIUS and/or Diameter protocol.

In a preferred embodiment of the invention, the authentication data integrated in the RADIUS and/or Diameter protocol is transmitted in a data network that can be connected to the WLAN network to a RADIUS and/or Diameter server that is then able to process said authentication data. Conversely, authentication data of the RADIUS and/or Diameter protocol that arrives in the access node from a data network that can be connected to the WLAN network is preferably also integrated as SIP authentication data in SIP messages and transmitted to the terminal device. In this way authentication between a terminal device of the WLAN network and a remote RADIUS and/or Diameter server of a further data network is possible.

The SIP authentication data is preferably extracted in one or more SIP Proxy CSCF and RADIUS and/or Diameter servers.

In a further preferred embodiment of the invention, the SIP authentication data is generated using known authentication mechanisms, such as, for example, Kerberos, Digest, AKA, USIM and similar.

The WLAN messages preferably contain specific messages concerning possible data connections of the terminal device via the access node to data networks that can be connected to the WLAN network. This enables inquiries or information concerning possible data connections to be addressed to the access node or, as the case may be, to data networks that can be connected to the access node. It can therefore be clarified before the initialization of the data connection whether a data connection desired by the user is possible or, alternatively, which data connections at all can be set up via the WLAN network.

In a particularly preferred embodiment, the specific messages are evaluated and, depending on the results of the evaluation, it is decided whether the data connection is possible or, as the case may be, which data connection of the terminal device via the access node will be used to one or more of the data networks that can be connected to the WLAN network. The desired data connection can thus be provided to the user of the terminal device automatically or, alternatively, the user can be informed that the data connection required for his or her purposes is not possible at all via the WLAN network.

The specific messages preferably contain inquiries and/or information in relation to one or more data connection types and/or qualities of data connection and/or data connection costs and/or services provided by the data connection. The user of the terminal device is therefore provided with a multiplicity of decision criteria according to which he or she can specify his or her desired data connection.

In a particularly preferred embodiment, the specific messages are tunneled in the WLAN messages.

In a further particularly preferred embodiment the specific messages are transmitted within the SIP messages, the SIP messages here containing SDP messages (SDP=Session Description Protocol) in which at least some of the specific messages are stored. The SDP protocol is sufficiently well known from the prior art (see [4]) and is used for describing a protocol session, more particularly in IP-based networks. In this context the term SDP includes both the currently used SDP protocols and SDP protocols that are presently in the process of development, such as, for example, SDPng (=SDP next generation). When SIP/SDP messages are used, the messages can be for example Probe Request and Probe Response messages of the WLAN protocol. Alternatively, however, the messages can also be newly defined messages in the WLAN protocol.

In a further particularly preferred embodiment of the invention, the SIP messages are contained in EAP messages (EAP=Extensible Authentication Protocol). This protocol is likewise sufficiently well known from the prior art (see for example [5]) and is used to provide authentication mechanisms for a point-to-point connection.

In a particularly preferred embodiment the WLAN messages conform to the WLAN standard IEEE 802.11. Furthermore, the data networks that can be connected to the WLAN network include one or more 3GPP and/or IP networks.

In addition to the above described transmission methods according to the invention, the invention also comprises a device for transmitting data in a WLAN network, the device including:

an access node, whereby WLAN messages can be transmitted between the access node and a terminal device in the L2 protocol layer (L2=Layer 2) and the WLAN messages contain SIP messages with SIP authentication data, a computing unit connected to the access node for the purpose of extracting the SIP authentication data from WLAN messages arriving in the access node and for integrating the extracted SIP authentication data into messages of the RADIUS and/or Diameter protocol.

In a particularly preferred embodiment of the device according to the invention, the computing unit comprises an SIP Proxy CSCF server (CSCF=Call State Control Function) and a RADIUS and/or Diameter server. Moreover, the computing unit is preferably integrated in the access node.

In addition, the invention comprises a data network with a WLAN network and one or more networks that can be connected to the WLAN network, the data network being embodied in such a way that the above described method according to the invention can be performed.

Exemplary embodiments of the invention are described below with reference to the attached drawings.

DETAILED DESCRIPTION OF INVENTION

Figure 1:
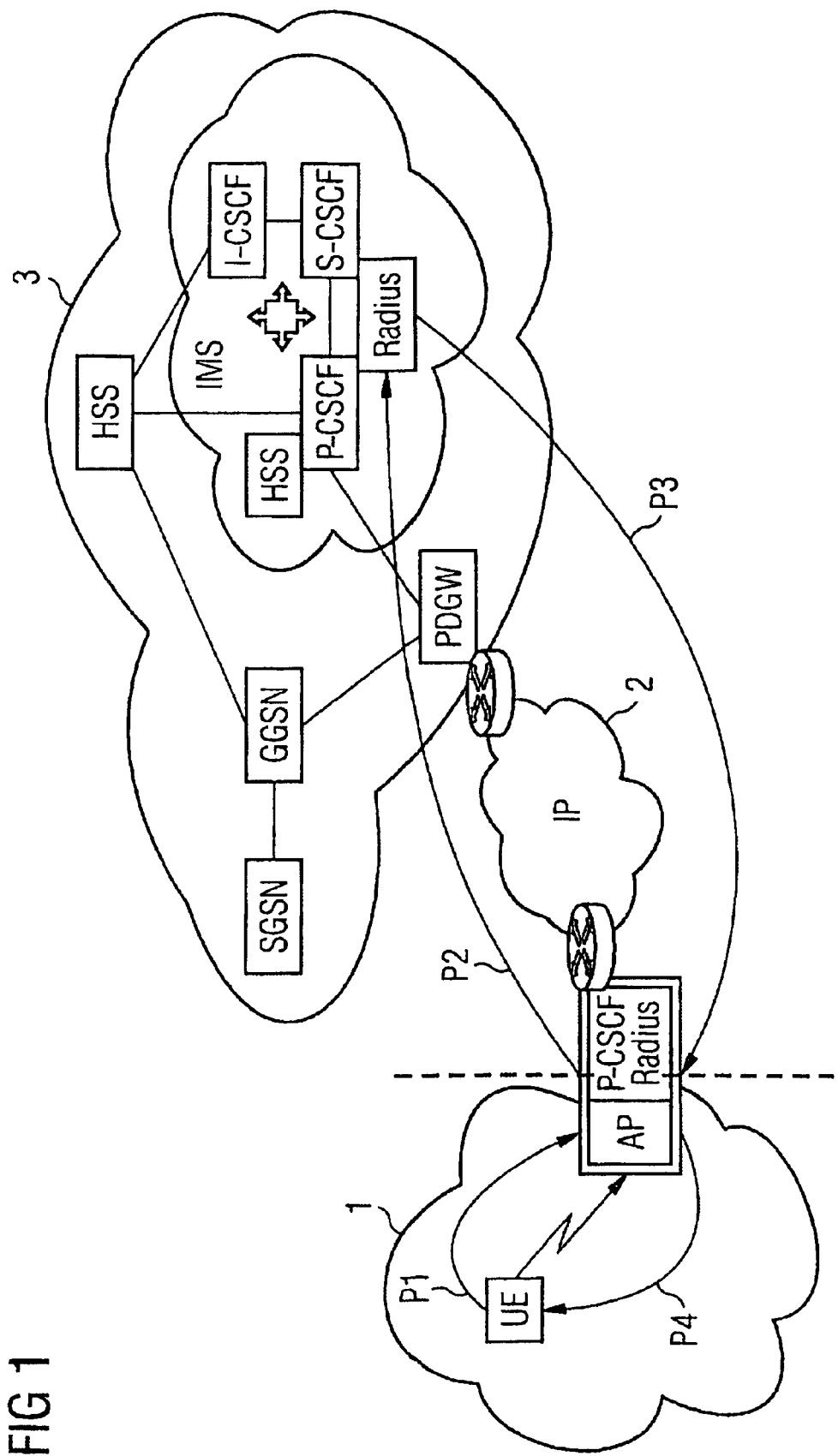
FIG. 1 is the schematic representation of a data network in which the data transmission method according to the invention can be performed, and FIG. 2A & 2B diagrams representing the transmission of SIP authentication data in the SIP protocol.

The data network represented schematically in FIG. 1 comprises a WLAN network 1, an IP network 2 and a 3GPP network 3. A user terminal device UE (User Equipment), which can be, for example, a mobile radio device or a laptop is wirelessly connected (as indicated by the zigzag arrow) to an access node AP (AP=Access Point) of the WLAN network. The access point AP is in turn connected to a Proxy CSCF server P-CSCF and a RADIUS server Radius. Proxy CSCF servers are already well known from the prior art and are used for processing SIP/SDP messages. Similarly, RADIUS servers are well known from the prior art, said servers being able to process messages of the RADIUS protocol.

The IP network 2 is connected to the access node AP or, as the case may be, to the P-CSCF/RADIUS servers. Said IP network is in turn connected to the 3GPP network 3. As well as a further RADIUS and P-CSCF server, the 3GPP network comprises a plurality of components with the designations SGSN, GGSN, HSS, IMS, I-CSCF, S-CSCF and PDGW. The components identified by these abbreviations are universally known building blocks of a 3GPP network and the terms hidden behind the abbreviations are generally known to the person skilled in the art. Since the structure of the 3GPP network plays no significant role insofar as the method according to the invention is concerned, this structure will not be dealt with in any further detail below. Suffice it to mention that the IP network is connected to the 3GPP network via the gateway PDGW.

In the method according to the invention, SIP authentication data is transmitted via the path P1 to the access node AP. The authentication data is extracted from the SIP messages in the servers P-CSCF and Radius, which are connected to the access node AP, and integrated into messages of the RADIUS protocol. The latter messages can be processed by the server Radius, which is connected to the access node AP, and forwarded to a further RADIUS server, in particular via the path P2. Said further Radius server carries out the authentication and returns a response in the RADIUS protocol via the path P3. Said response is in turn processed in the RADIUS server connected to the access node AP, with the authentication data of the RADIUS protocol now being integrated again into SIP messages that can be processed by the server P-CSCF. The extracted authentication data is then forwarded via the path P4 to the terminal device UE, where it is evaluated. Thus, a comprehensive authentication can be performed by means of the method according to the invention between a terminal device in the WLAN network and a RADIUS server in a network that can be connected to the WLAN network. In particular, the processing of SIP authentication data is guaranteed in networks that perform authentication by way of the RADIUS protocol.

In the exemplary embodiment of the method according to the invention described here, the SIP messages also contain SDP messages in which are stored inquiries or information concerning possible data connections of the terminal device UE via the access node AP to the IP network and/or the 3GPP network.

These inquiries or information can include in particular an access request which is specified by the user of the terminal device. For example, the access request can concern the type of data connection by means of which a data transmission is to take place via the access node. The user can, for example, specify that the data connection is to be set up via the internet. An inquiry of said kind can also relate to a bandwidth desired by the user or to a delay or jitter of the data connection. It is therefore possible to choose the provider, for example in unfamiliar foreign networks, according to predetermined criteria.

The transmission of SIP messages containing SIP authentication data from a user agent UA, which is integrated for example in a terminal device, to an SIP server SIP-S is illustrated schematically in FIG. 2. The SIP authentication data that is exchanged during the authentication is shown underlined in FIG. 2. Said authentication data is sufficiently well known to the person skilled in the art, so its meaning will not be explained in further detail here. The method according to the invention is characterized in that the SIP authentication data of the SIP messages is extracted and integrated into messages of the RADIUS and/or Diameter protocol.

The Kerberos authentication mechanism already well known from the prior art is used in the authentication depicted in FIG. 2. However, other known authentication mechanisms such as, for example, Digest or USIM can also be used. Instead of an extraction of the SIP authentication data, it would also be possible in an extreme case to transport the entire SIP message via the RADIUS and/or Diameter protocol, without extracting individual components.

REFERENCES

Internet Engineering Task Force (IETF) Request For Comments (RFC) 3261 2865, draft-ietf-aaa-diameter-17, 2327, and 2284.
[1] http://www.ietf.org/rfc/rfc3261.txt
[2] http://www.ietf.org/rfc/rfc2865.txt
[3] http://www.ietf.org/internet-drafts/draft-ietf-aaa-diameter-17.txt
[4] http://www.ietf.org/rfc/rfc2327.txt
[5] http://www.ietf.org/rfc/rfc2284.txt

The invention claimed is:

1. A method for transmitting data between a Wireless Local Area Network (WLAN) using Session Initiation Protocol (SIP) protocol and a remote authentication server in a further data network connected to the WLAN, wherein the remote authentication sever does not recognize SIP protocol and uses a different protocol but uses the same authentication mechanisms as in the SIP Protocol, comprising:
  receiving by an access node of the WLAN a WLAN message using SIP protocol from a terminal device, wherein the access node is connected to a computing unit and further connectable to a further data network comprising a remote authentication sever that does not recognize SIP protocol and uses a different protocol, wherein the WLAN message contains a Session Initiation Protocol message (SIP message) comprising SIP authentication data, and wherein the computing unit comprises both a SIP Proxy Server to interface with the terminal device using SIP protocol and a second Server comprising a Remote Authentication Dial In User Service (RADIUS) Server or a Diameter Server for processing messages in RADIUS or Diameter Protocol;
  processing the SIP authentication data by the SIP Proxy Server of the computing unit;
  extracting the SIP authentication data from the WLAN message by the computing unit,
  integrating by the computing unit the SIP authentication data as remote authentication data into an authentication message in the different protocol used by the remote authentication server comprising RADIUS protocol or Diameter protocol, wherein the same authentication mechanism is used by the remote authentication server as used by the SIP Proxy Server thereby allowing the SIP authentication data to be the same as the remote authentication data, albeit in a different protocol,
  transmitting the authentication message in the different protocol to the remote authentication server for processing the remote authentication data in the further data network for authentication,
  receiving a response at the computing unit in the different protocol from the remote authentication server,
  processing and extracting the authentication data of the received response in the different protocol by the RADIUS or Diameter Server of the computing unit,
  incorporating the extracted authentication data back into a SIP message using SIP protocol for processing by the SIP Proxy Server, and
  transmitting the SIP message to the terminal device for evaluation by the terminal device.

2. The method as claimed in claim 1, wherein the SIP authentication data is generated using an authentication mechanism selected from the group consisting of Kerberos, Digest, AKA, and USIM.

3. The method as claimed in claim 1, wherein a message concerning a possible data connection of the user terminal device is transmitted in the WLAN message via the access node to the further data network.

4. The method as claimed in claim 3, further comprising:
  evaluating the message concerning possible data connection;
  determining whether the data connection is possible; and
  deciding which data connection of the terminal device via the access node will be used for the data transmission to further data network.

5. The method as claimed in claim 3, wherein the message concerning the possible data connections of the terminal device includes an inquiry and/or information relating to at least one connection parameter selected from the group consisting of data connection type, quality of the data connection, data connection costs and services provided by the data connection.

6. The method as claimed in claim 3, wherein the message concerning the possible data connection is tunneled in the WLAN message.

7. The method as claimed in claim 3, wherein the message concerning the possible data connection is transmitted within the SIP message.

8. The method as claimed in claim 7, wherein the message concerning the possible data connection is a Probe Request and/or a Probe Response message of the WLAN protocol.

9. The method as claimed in claim 3, wherein the message concerning the possible data connection is a Probe Request and/or a Probe Response message of the WLAN protocol.

10. The method as claimed in claim 7, wherein a plurality of messages concerning the possible data connection is transmitted in the WLAN message, and wherein the SIP messages contains a SDP message (Session Description Protocol message) in which at least one the messages concerning the possible data connection of the terminal device is incorporated in the SDP message.

11. The method as claimed in claim 1, wherein the WLAN message conforms to the WLAN standard IEEE 802.11.

12. The method as claimed in claim 1, wherein the further data network comprises comprise a 3GPP network and/or an IP network.

13. A system for transmitting data between a Wireless Local Area Network (WLAN) using Session Initiation Protocol (SIP) protocol and a remote authentication server in a further data network connected to the WLAN, wherein the remote authentication sever does not recognize SIP protocol and uses a different protocol but uses the same authentication mechanisms as in the SIP Protocol, comprising:
  an access node for receiving a WLAN message using SIP protocol from a user terminal device, the WLAN message containing SIP (Session Initiation Protocol) messages with SIP authentication data, wherein the access node is connectable to a further data network comprising a remote authentication sever that does not recognize SIP protocol and uses a different protocol; and a computing unit connected to the access node, wherein the computing unit comprises both a SIP Proxy Server to interface with the terminal device using SIP protocol and a second Server comprising a Remote Authentication Dial In User Service (RADIUS) Server or a Diameter Server for processing messages in RADIUS or Diameter Protocol, wherein the computing unit processes the SIP authentication data by the SIP Proxy Server and for extracts the SIP authentication data from WLAN messages received by the access node and integrates the extracted SIP authentication data as remote authentication data into an authentication message in the different protocol used by the remote authentication server comprising the RADIUS or Diameter protocol, wherein the same authentication mechanism is used by the remote authentication server as is used by the SIP Proxy Server thereby allowing the SIP authentication data to be the same as the remote authentication data, albeit in a different protocol, the computing unit further receives back from the remote authentication server a response, processes the response, extracts the authentication data therein, incorporates the authentication data back into a SIP message using SIP protocol, and transmits the SIP message back to the user terminal device for evaluation.

* * * * *